March 18, 1969  J. N. BRADE  3,433,001
ADJUSTABLE PITCH BREAK BACK TYPE OF RECIPROCATING
KNIFE MOWER FRAME MOUNT
Filed Oct. 22, 1965  Sheet 2 of 2
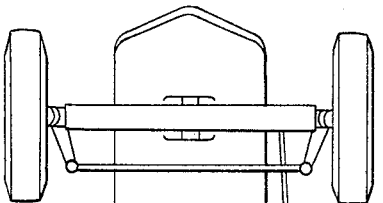
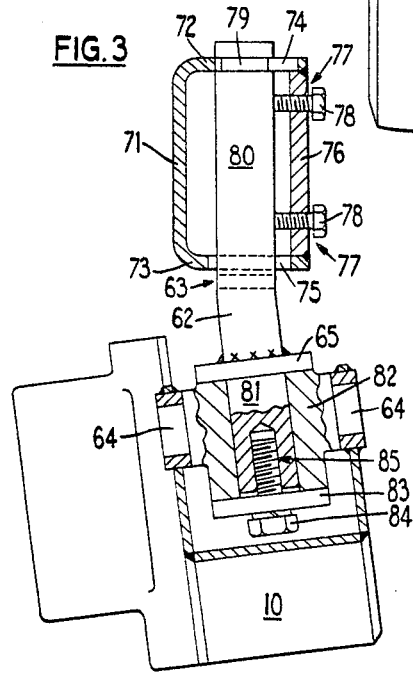
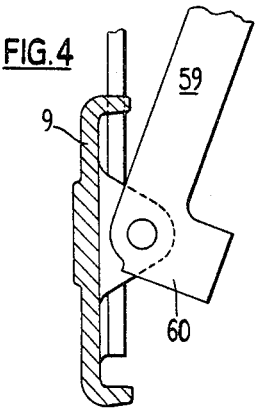
Inventor
JAMES NEVILLE BRADE
By Norris & Bateman
Attorneys

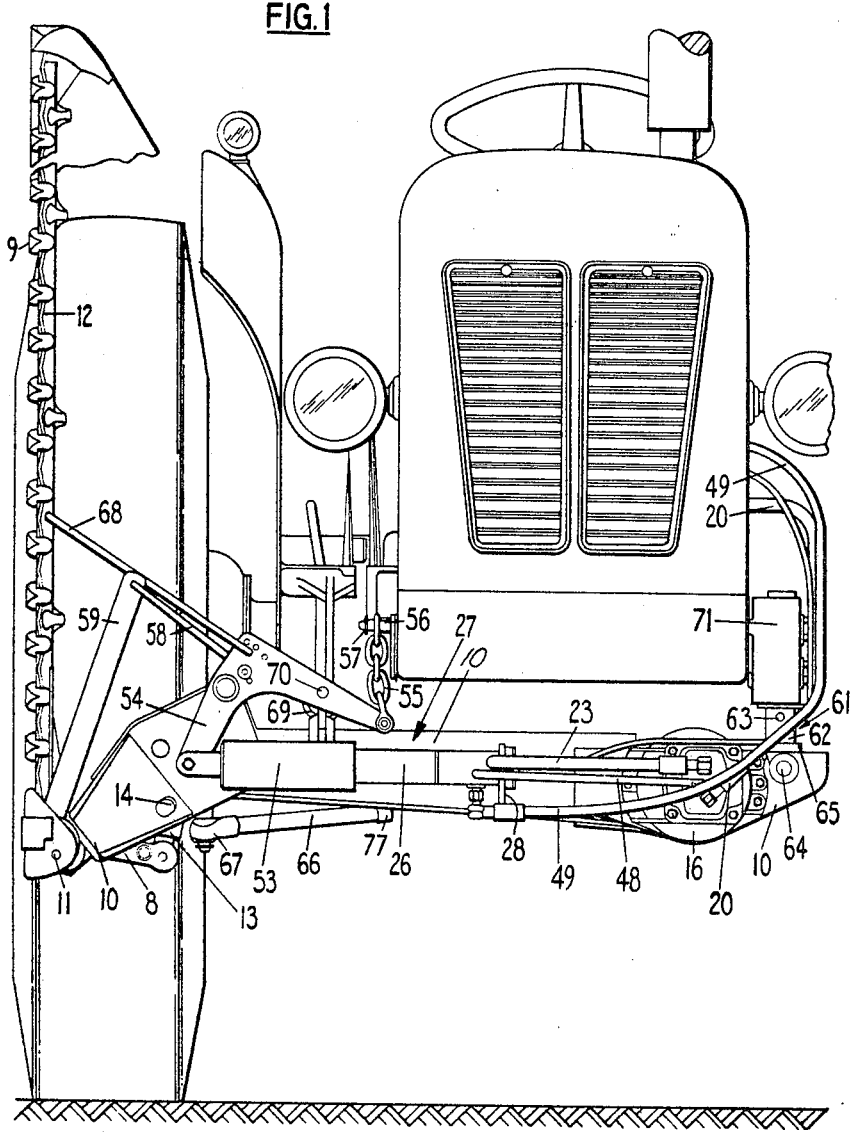

United States Patent Office 3,433,001
Patented Mar. 18, 1969

3,433,001
ADJUSTABLE PITCH BREAK BACK TYPE OF RECIPROCATING KNIFE MOWER FRAME MOUNT
James N. Brade, Churchtown, Southport, England, assignor to Harrison, McGregor and Guest Limited
Filed Oct. 22, 1965, Ser. No. 501,877
Claims priority, application Great Britain, Oct. 29, 1964, 44,084/64
U.S. Cl. 56—25        10 Claims
Int. Cl. A01d 35/02, 55/32

ABSTRACT OF THE DISCLOSURE

A mowing machine of the type adapted to be midmounted on a tractor comprises a frame carrying a reciprocating knife-bar. A connecting member between the tractor and frame has a first portion rigidly connected to the tractor in an angularly adjusted location about a vertical axis and a second angularly related portion pivotally connected by trunnions to the frame. A telescopic strut element connects a point on the frame spaced laterally of the connecting member to a longitudinally spaced point on the tractor and this element collapses if the machine meets with an obstruction or other overload whereupon the mowing machine can pivot rearwardly relative to the tractor about the axis of one of the portions of the connecting member.

---

The invention relates to mowing machines of the reciprocating knife-bar type for mounting on agricultral tractors.

The principal object of the invention is to enable the pitch of the knife-bar to be adjusted, that is to say to enable the leading edge of the knife-bar to be disposed at a lower level than the trailing edge thereof for cutting a matted crop, to be set at the same level as the trailing edge for cutting a normal crop, or to be disposed at a higher level than the trailing edge for cutting a crop on stony land. A further object is to enable the machine to pivot rearwardly relative to the tractor on which it is mounted if it meets with an obstruction or other overload.

According to the invention, in a mowing machine of the reciprocating knife-bar type, pitch control means comprise a member having a generally vertical portion adapted to be connected to a tractor and an inclined portion connected to the machine. Preferably, the machine comprises a telescopic member adapted to connect a point on the machine spaced laterally from the pitch control means to a point on the tractor spaced longitudinally from said point on the machine, said member being adapted to collapse if the machine meets with an obstruction or other overload whereupon the machine can pivot rearwardly relative to the tractor about the axis of one of the portions of the pitch control means.

A preferred embodiment of the invention will now be described, by way of example only, with reference to the accompanying drawings, of which:

FIG. 1 is a front elevation of a mowing machine mounted in transport position on a tractor, parts of the tractor, notably the front axle and front wheels, having been omitted for clarity;

FIG. 2 is a view, on a smaller scale, on the underside of the mowing machine and tractor;

FIG. 3 is a sectional elevation, on a larger scale, of pitch control means for the mowing machine; and FIG. 4 is a front elevation, also on a larger scale, of a lever mechanism on the mowing machine.

Referring now to the drawings, a mowing machine for midmounting on an agricultural tractor comprises a conventional knifebar 12 reciprocable on a bed 9 pivotally connected to a frame 10 about an axis 11. The knifebar 12 is driven by a connecting rod 8 by an oscillating lever 13 pivotally mounted on an axle 14 rigidly secured to the frame 10. The lever 13 is driven via a pitman (not shown) by a gear-type hydraulic motor 16 rigidly secured to the frame 10. The frame 10 of the mowing machine is adapted to be attached to the tractor at three points disposed at the respective apices of an imaginary triangle.

The first point of attachment of the frame 10 to the tractor is formed by pitch control means (indicated generally at 61) for the mowing machine. Said means comprise a length of round bar 62 (see FIG. 3) having an upper portion 80 and a lower portion 81 with mutually inclined intersecting axes. The upper portion 80 is adapted to be clamped, with its axis generally vertical, to a bracket 71 secured rigidly to the tractor, and the lower portion 81 is adapted to be pivotally connected to the frame 10. The bracket 71 has two vertically spaced flanges 72 and 73 having respective square holes 74 and 75 formed therein between which a plate 76 provided with two threaded holes 77, 77 is welded. An annular groove 79 formed in the upper portion 80 of the bar 62 engages two edges of the upper hole 74 to locate the bar 62 endwise while two set screws 78, 78 engaging the threaded holes 77, 77 provide the clamping force. The lower portion 81 of the bar 62 pivotally supports a sleeve 82 provided with trunnions 64 which engage aligned holes in the frame 10. The sleeve 82 is clamped lightly against a collar 65 welded onto the lower portion 81 by a washer 83 carried on a setscrew 84 which engages a threaded hole 85 formed in the lower end of the bar 62. A diametrical hole 63 is provided in the bar 62 in which a rod can be inserted to rotate said bar relative to the bracket 71 when the setscrews 78, 78 are slackened. The included angle between the axes of the upper and lower portions 80 and 81 of the bar 62 is, say, 173 degrees. Thus the frame 10 and the knife bed 9 can be inclined at an angle of attack of up to 7 degrees above or below the horizontal by rotatable adjustment of the length of round bar 62.

The second point of attachment of the frame 10 to the tractor is formed by a telescopic strut 66 (see FIG. 2) connected to said frame by means of a ball joint 67 and adapted to be connected by means of a ball joint 77 to the tractor rear axle casing. The strut 66 is adapted to collapse if the mowing machine meets with an obstruction or other overlead.

The third point of attachment of the frame 10 to the tractor is formed by a short length of chain 55 (see FIG. 1), the upper end of which is removably secured to a stud 56 on the tractor by a linchpin 57, and the lower end of which is pivotally connected to one arm of a bell-crank lever 54 pivotally mounted on said frame. The other arm of the bell-crank lever 54 is pivotally connected to the cylinder 53 of a hydraulic jack (indicated generally at 27), the ram 26 of which is pivotally connected to a bracket 28 welded onto the frame 10. A single chain link 69 pivotally mounted on the frame 10 is placed over a pin 70 rigidly secured to the bell-crank lever 54 to hold said frame in the transport position shown in FIG. 1. The bell-crank lever 54 is also connected by a link 58 to a lever 59 pivotally mounted on the knife bed 9. The lever 59 is formed integrally with a foot 60 (see FIG. 4) which engages the knife bed 9 when said lever is at right angles thereto. The knife bed 9 is thus free to move anti-clockwise relative to the frame 10 between the transport position shown in FIG. 1, where it is held by a quickly detachable stay 68, and its working position at right angles to the lever 59.

As shown in FIG. 1, the hydraulic motor 16 and the hydraulic jack 27 are connected to one another by conduits 23 and 48, and to a conventional hydraulic pump on the tractor by conduits 20 and 49. The complete hydraulic system is described in detail in our co-pending application for Patent No. 411,481, now U.S. Letters Patent No. 3,374,610 issued Mar. 26, 1968.

To put the mowing machine into operation, the stay 68 is removed and the knife-bar 9 is lowered manually until it engages the foot 60 on the lever 59. The hydraulic system is then conditioned to cause the motor 16 to drive the knife-bar 12 and the jack 27 to extend sufficiently to release the single chain link 69 from the pin 70. The jack 27 is then caused to retract and the frame 10 pivots in an anti-clockwise direction about the trunnions 64 as viewed in FIG. 1. Simultaneously, the knife bed 9 pivots anticlockwise about the axis 11, as viewed in FIG. 1, reaching a horizontal position as it engages the ground. The jack 27 is caused to extend whenever it is necessary to raise the knife bed 9 and the frame 10 relative to the ground. The angular movement of the knife bed 9 relative to the frame 10 caused by extension and retraction of the jack 27 is, say, 10 degrees. When the mowing machine is to be transported the knife bed 9 and the frame 10 are raised, by extending the jack 27, and the single chain link 69 is placed over the pin 70. The hydraulic system is then conditioned to cause the motor 16 to stop driving the knife-bar 12. The knife bed 9 is then raised manually into the transport position and the stay 68 is replaced.

In a modification, the collapsible telescopic strut 66 is replaced by a rigid strut. In another modification, the collapsible strut 66 is replaced by either a collapsible telescopic tie or a rigid tie extending forwardly from the frame 10 to an attachment point adjacent the front axle of the tractor. In yet another modification, the single chain link 69 and the pin 70 are replaced by a catch operable from the driving position on the tractor.

What I claim is:
1. A mowing machine comprising a frame, a reciprocating knife-bar carried by said frame, and means for connecting said frame to a tractor, said means including a member having a first portion adapted to be connected to the tractor and positioned in an angularly adjustable location on a substantially vertical axis and a second portion connected to the frame and disposed at an angle relative to the first portion.

2. A mowing machine according to claim 1, wherein said first portion is cylindrical.

3. A mowing machine comprising a frame, a reciprocating knife-bar carried by said frame, and means for connecting said frame to a tractor, said means including a member having a first portion adpated to be connected to the tractor and positioned in an angularly adjustable location on a substantially vertical axis and a second portion connected to the frame and having an axis which is disposed at an angle relative to the axis of the first portion and intersects the last mentioned axis.

4. A mowing machine comprising a frame, a reciprocating knife-bar carried by said frame, and means for connecting said frame to a tractor, said means including a member having a first portion adapted to be rigidly clamped to the tractor and positioned in an angularly adjustable location on an axis and a second portion connected to a surrounding sleeve having trunnions on which the frame is pivotally mounted.

5. A mowing machine comprising a frame, a reciprocating knife-bar carried by said frame, and means for connecting said frame to a tractor, said means including a member having a first portion adapted to be rigidly clamped to the tractor and positioned in an angularly adjustable location on an axis and a second portion frictionally connected to a surrounding sleeve having trunnions on which the frame is pivotally mounted.

6. A mowing machine comprising a frame, a reciprocating knife-bar carried by said frame, and means for connecting said frame to a tractor, said means including a member having a first portion adapted to be connected to the tractor and positioned in an angularly adjustable location on a substantially vertical axis and a second portion connected to the frame and disposed at an angle relative to the first portion, and including also a collapsible element adapted to connect a point on the frame spaced laterally from said member to a point on the tractor spaced longitudinally from said point on the frame, said element being adapted to collapse if the machine meets with an obstruction or other overload whereupon the machine can pivot rearwardly relative to the tractor about the axis of one of the portions of said member.

7. A mowing machine comprising a frame, a reciprocating knife-bar carried by said frame, and means for connecting said frame to a forward part of a tractor, said means including a member having a first portion adapted to be rigidly clamped to the tractor and positioned in an angularly adjustable location about a substantially vertical axis and a second portion connected to the frame and disposed at an angle relative to the first portion, and including also a telescopic element adapted to connect a point on the frame spaced laterally from said member to a point on the tractor spaced longitudinally from said point on the frame, said element being adapted to collapse if the machine meets with an obstruction or other overload whereupon the machine can pivot rearwardly relative to the tractor about the axis of said second portion of said member.

8. A mowing machine of the reciprocating knife-bar type adapted for mounting on the forward part of a tractor, said machine comprising a frame adapted to extend transversely of the tractor, a reciprocable knife-bar carried by said frame, and means providing an adjustable connection between said frame and the tractor comprising a connecting member having an upper portion and an angularly related lower portion, means for attaching said upper portion to said tractor and mounting said upper portion for adjustment about a substantially vertical axis, means for adjusting said member about said axis, and means movably conecting the frame to said lower portion.

9. The mowing machine defined in claim 8, wherein said knife-bar is pivotally connected to one end of said frame, and the other end of said frame is pivotally connected to the lower portion of said member.

10. The mowing machine defined in claim 9, wherein said other end of the frame is pivotally mounted on generally horizontal trunnions at said lower portion of said member.

References Cited

UNITED STATES PATENTS

| | | | |
|---|---|---|---|
| 644,886 | 3/1900 | Anfinson | 56—288 |
| 668,649 | 2/1901 | Kuhn | 56—288 |
| 2,518,317 | 8/1950 | Hilblom | 56—25 |
| 2,617,242 | 11/1952 | Iverson | 56—25 |
| 2,684,564 | 7/1954 | Schroeppel | 56—25 |
| 2,729,044 | 1/1956 | Dunn et al. | 56—25 |
| 2,853,843 | 9/1958 | Elfes et al. | 56—25 |
| 2,880,562 | 4/1959 | Vutz | 56—25 |
| 3,139,719 | 7/1964 | Pflucke et al. | 56—288 |

ALDRICH F. MEDBERY, *Primary Examiner.*

U.S. Cl. X.R.

56—288; 336—110